United States Patent [19]

Angelbeck et al.

[11] 4,144,505
[45] Mar. 13, 1979

[54] AUTOALIGNMENT SYSTEM FOR LASER WITH UNSTABLE RESONATOR

[75] Inventors: Albert W. Angelbeck, Glastonbury, Conn.; Stuart N. Mapes, Satellite Beach, Fla.; George R. Wisner, Deep River, Conn.

[73] Assignee: The United States of America as represented by the Secretary of the Navy, Washington, D.C.

[21] Appl. No.: 844,690

[22] Filed: Oct. 25, 1977

[51] Int. Cl.$^2$ .................................... H01S 3/13
[52] U.S. Cl. .................. 331/94.5 S; 331/94.5 C; 356/152
[58] Field of Search .............. 331/94.5 C, 94.5 S; 356/141, 152

[56] References Cited

U.S. PATENT DOCUMENTS

| | | | |
|---|---|---|---|
| 3,764,220 | 10/1973 | Billman et al. | 331/94.5 C |
| 3,919,663 | 11/1975 | Caruolo et al. | 331/94.5 C |
| 3,977,788 | 8/1976 | Moore | 331/94.5 C |

*Primary Examiner*—William L. Sikes
*Attorney, Agent, or Firm*—R. S. Sciascia; A. L. Branning; A. S. Viger

[57] ABSTRACT

A method and system for automatically aligning a high power laser. The high power laser train includes an unstable resonator cavity and two turning mirrors to direct the pointing of the output laser beam. The autoalignment system is designed to perform two alignment tasks, the maintenance of output beam pointing stability and the establishment of resonator cavity mode control, by precisely adjusting the orientation of the end mirrors of the resonator cavity and the two turning mirrors. A HeNe laser, located at the output end of the high power laser train, propagates an alignment beam back along the laser train, parallel to the high power laser train. The alignment beam is divided into two separate alignment beams by means of a mirror splitter. One of the beams is directed on an optical alignment path which includes the two turning mirrors and is delimited by two null position detectors, one on an end mirror of the resonator cavity and one at the output end of the high power laser train. The other alignment beam is directed along the optical axis of the resonator cavity on an optical alignment path delimited by two more null position detectors, one on each of the two end mirrors of the resonator cavity. Since these two optical alignment paths include all the mirrors of the high power laser train, any misalignments in these mirrors will result in alignment beam deflections. The beam deflections are detected by the four null position detectors and translated, by means of an analog matrix control device, into corrective, correlative tilt adjustments to the mirrors of the high power laser train.

16 Claims, 3 Drawing Figures

AUTOALIGNMENT SYSTEM FOR LASER WITH UNSTABLE RESONATOR

BACKGROUND OF THE INVENTION

The present invention relates to the field of autoalignment systems for high power lasers and more particularly to autoalignment systems utilizing a separate alignment laser. In even greater particularity, the present invention relates to autoalignment systems for high power lasers capable of cavity mode control and beam pointing stabilization.

In many potential high power laser applications it is necessary to control the direction of output beam propagation to within a few micro-radians. Consequently, the development of highly accurate autoalignment systems for such lasers is of current interest. The extremely high power levels of high power lasers preclude the use of ordinary optical techniques employing such optical components as beam splitters and optical windows. Beyond this threshold constraint, the use of an unstable resonator cavity to generate the laser beam involves an additional consideration, namely mode control. Thus, in addition to maintaining the alignment of the mirrors of the laser train which point the output beam, an autoalignment system for a laser utilizing an unstable resonator cavity must be capable of establishing cavity mode control. In other words, two separate alignment functions must be accommodated by an autoalignment system for such a laser A further object of the present invention is to provide an autoalignment system which can provide both pointing stabilization for the output beam and mode control for the unstable resonator cavity.

Another object of the present invention is to provide an autoalignment system which utilizes a single, separate HeNe laser to provide an alignment beam coupled to and directed along the high power laser train.

Still another object of the present invention is to provide an autoalignment system in which only detector packages or secondary optical elements are placed on the main laser mirrors.

Yet another object of the present invention is to provide an autoalignment system of the character described in which detected displacements of an alignment beam can be translated into compensating tilt adjustments to the controlled mirrors of the high power laser train.

Accordingly, to accomplish these and other objects, the present invention provides a method and system for automatically aligning a high power laser. The high power laser train includes an integral unstable resonator oscillator for generating the laser beam and two turning mirrors to point the beam. The unstable resonator cavity is defined by two end mirror configurations: a concave end mirror and a combination convex/coupling end mirror. The convex/coupling mirror comprises the integral combination of a central convex mirror circumscribed by a flat, annular, coupling mirror. The laser beam generated between the concave and the convex mirrors of the resonator cavity is coupled out of the cavity by means of the coupling mirror, being reflected configuration, pointing stabilization for the output laser beam and mode control for the unstable resonator cavity.

One technique suggested for automatically aligning high power laser systems entails the use of a separate, usually HeNe (helium/neon), laser to provide a low-power alignment beam. The alignment beam is coupled to and directed along the optical train of the high power laser, propagating through all the relay optics of the main laser apparatus. A straight forward method of implementing this autoalignment technique in a gas dynamic laser apparatus utilizing an unstable resonator cavity would be to use two autoalignment systems. One would be used to control and adjust the mirrors directing the pointing of the output laser beam; the other would be used to establish mode control for the resonator cavity. However, because of the frequency-response requirements of dynamic mirror mounts and the geometric constraints resulting from the requirements of low-pressure optical boxes for the gas dynamic laser train, it is not feasible to place the autoalignment system directly on the mirror mounts. These frequency response requirements and geometric constraints necessitate that the structural components of an autoalignment system placed directly on the main laser mirrors be limited to detector packages and secondary optical elements.

SUMMARY OF THE INVENTION

It is therefore an object of the present invention to provide an autoalignment system for a high power laser. in a path incident to one of the turning mirrors. The laser beam reflects in the direction of the second turning mirror and, in turn, reflects in the preferred output direction. The autoalignment system is designed to perform the two alignment tasks required by such a laser train configuration, pointing stabilization for the output beam and mode control for the unstable resonator cavity. An HeNe laser, located at the output end of the laser train, propagates an alignment beam back along the high power laser train, parallel to the output laser beam. The alignment beam reflects from the second turning mirror on a path incident to a mirror splitting device attached in parallel relation to the first turning mirror. The mirror splitting device separates the incident alignment beam into two separate, parallel beams, a pointing-alignment beam and a mode-control beam, and reflects them, still parallel, to the high power laser beam, toward the resonator coupling mirror. The pointing-alignment beam impinges on a partially reflective window, being partially reflected back along an optical path coincident with the incident pointing-alignment beam and the alignment beam. At the output end of the laser train, the partially reflected pointing alignment beam impinges on a beam splitter which directs the beam in a path incident to a null position detector. The partially transmitted portion of the pointing-alignment beam impinges on a second null position detector located on the coupling mirror of the resonator cavity. The mode-control beam, after reflecting from the mirror splitting device in a path incident to the resonator cavity coupling mirror, reflects from the coupling mirror in a path along the optical axis of the resonator cavity. The mode-control beam impinges on a partially reflective window, being partially reflected back to impinge upon a null position detector located on the coupling mirror, and partially transmitted to impinge upon a fourth null position detector located on the resonator cavity concave end mirror. Since the optical paths of the pointing-alignment beam and the and mode-control beam include all the mirrors of the high-power laser train, misalignments in these structural components will result in deflections in the beams from which deflections in the high power laser beam can be inferred. Any such deflections are detected by the four null position detectors which transmit corresponding error signals to a system-correlated matrix array control device. The matrix control device translates these error signals into compensating tilt adjustments to the end mirrors of the resonator structure and/or the two turning mirrors. The tilt adjustments are precisely correlated to correct misalignments in the mirrors of the laser train, thereby establishing mode control for the resonator cavity and maintaining pointing stability for the output laser beam.

A more complete appreciation of the present invention and many of the attendant advantages thereof will be readily apparent as the same becomes better understood by reference to the following detailed description, with the appended claims, when considered in conjunction with the accompanying drawing.

DESCRIPTION OF THE PREFERRED EMBODIMENT

Figure 1:
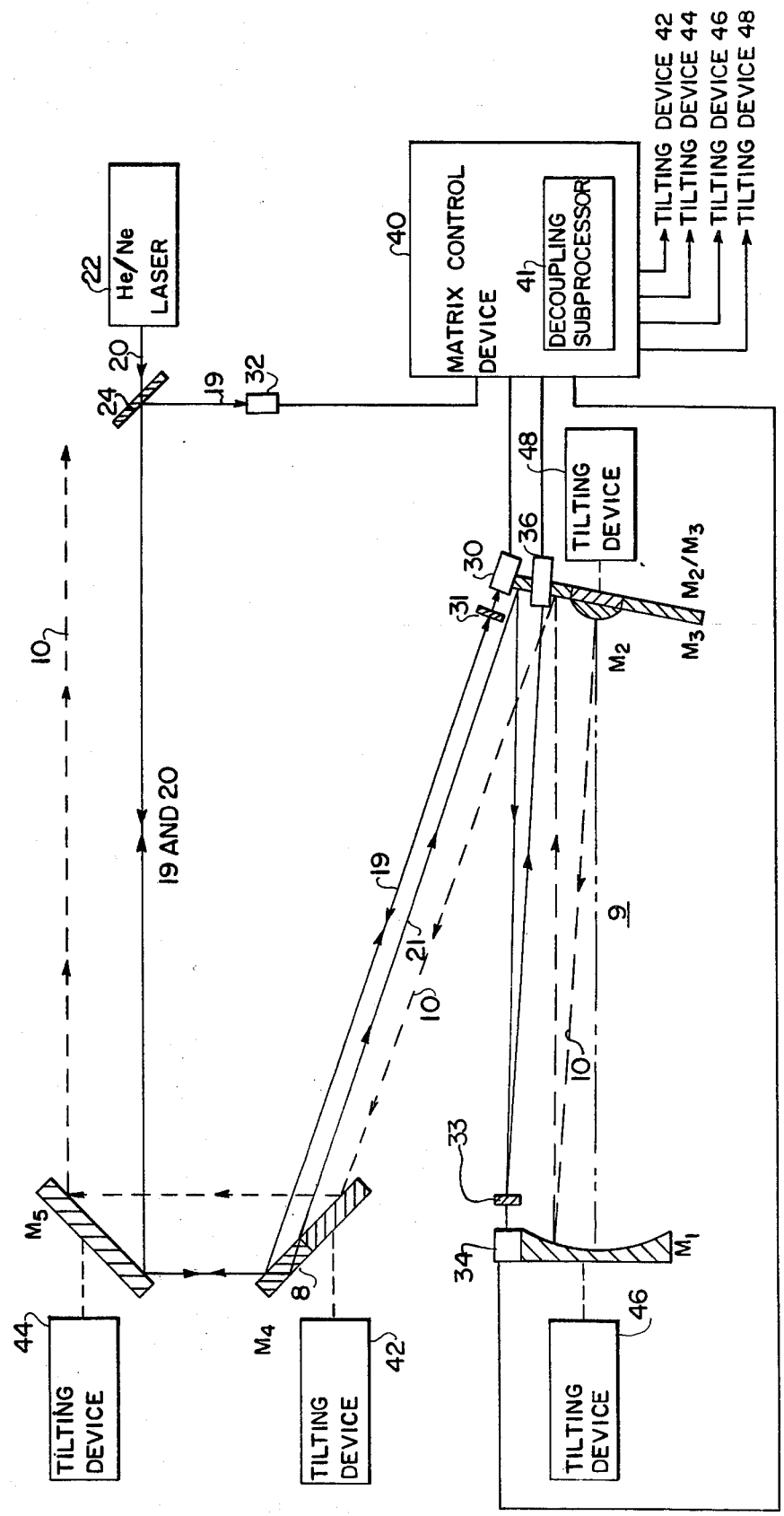
FIG. 1 is a simplified plan view of a high power, gas dynamic laser with an unstable resonator cavity (the low pressure, gas envelope, optical boxes not being shown) including an autoalignment system in accordance with the present invention.

FIG. 1 shows the main elements of a high power, gas dynamic laser. The laser train comprises an unstable resonator cavity 9 and two turning mirrors $M_4$ and $M_5$. Not shown are the low-pressure, gas envelope optical boxes and the aerodynamic window interface commonly employed in high power, gas dynamic lasers. In addition, none of the various relay optics commonly found in the optical trains of these lasers are shown as they have no affect on the operation of the autoalignment system according to the present invention. Resonator cavity 9 is defined by two end mirror configurations: a concave mirror $M_1$ and a combination convex/coupling mirror $M_2/M_3$. Convex/coupling mirror $M_2/M_3$ comprises the intergral combination of a convex mirror $M_2$ circumscribed by a flat, annular, coupling mirror $M_3$ such that the two mirrors are fixedly joined and essentially no gap exists between their mirror surfaces. Concave mirror $M_1$ and convex mirror $M_2$ are centered about the optical axis of resonator cavity 9 and constitute the unstable resonator oscillator optics of the resonator cavity. Mirrors $M_1$, $M_2/M_3$, $M_4$ and $M_5$ are all water-cooled, high-power laser mirrors, each having its orientation precisely controlled by means of a respective tilting device. Thus, a tilting device 42 is coupled to turning mirror $M_4$, a tilting device 44 is coupled to turning mirror $M_5$, a tilting device 46 is coupled to concave mirror $M_1$ and a tilting device 48 is coupled to convex/coupling mirror $M_2/M_3$. Tilting devices 42, 44, 46 and 48 may each be any means of tilt control, such as piezoelectric or hydraulic drivers, capable of implementing precision, high frequency tilt adjustments with respect to two orthogonal axes of rotation. For each respective mirror, the required axes of tilt are an axis perpendicular to the plane of the schematic depicted in FIG. 1 and an axis parallel to the flat surface of the mirror. As will be described below, the precise tilt adjustments to the orientation of mirrors $M_1$, $M_2/M_3$, $M_4$ and $M_5$ are derived from detected misalignments in these mirrors.

The operation of the high power laser is as follows. A resonating region is established between concave mirror $M_1$ and convex mirror $M_2$. Radiation oscillates between these two mirrors, along the optical axis of unstable resonator cavity 9, gradually "walking-off" convex mirror $M_2$ to impinge on the intergral, flat coupling mirror $M_3$. Coupling mirror $M_3$ reflects the walk-off radiation out of resonator cavity 9, forming a symmetrical, annular laser beam 10. Laser beam 10 is reflectively coupled out of resonator cavity 9 on a path incident to turning mirror $M_4$. It reflects from this turning mirror on a path incident to turning mirror $M_5$ and, in turn, reflects therefrom in the preferred output direction.

A laser configuration of the type described above is subject to two forms of operational deterioration. First, or course, misalignments in the various optical relays of the high power laser train can induce beam angular deviations. Such misalignments can result from temperature variations in the mirror mounts, and mechanical load variations on mirrors and mirror mounts due to cooling water pressure and flow. These distortions, while small, are not negligible in light of the requirement of microradian accuracy. Secondly, misalignments in the mirrors of the resonator cavity can cause a distortion in cavity "mode". As a result, instead of a symmetrical, annular beam of radiation, laser beam 10 would tend to become crescent shaped. Such a deterioration in the symmetrical "look" of laser beam 10 would result in inefficient power loss. For these reasons, it is advantageous that an autoalignment system for the above laser configuration be capable of performing two autoalignment tasks, pointing stabilization for output laser beam 10 and mode control for unstable resonator 9.

Establishing pointing stabilization for laser beam 10 involves compensating for two types of pointing error, angular or rotational beam deviations and translational beam displacements. Misalignments in the relay optics of the high power laser train can result in two rotational degrees of beam deviation, herein denominated $\theta$ and $\phi$. These misalignment-induced angular deviations can be compensated by means of two degees of rotational tilt adjustments to at least one mirror of the laser train. However, the two rotational degrees of tilt correction unavoidably induce two degrees of translational beam displacement, herein denominated X and Y. To compensate for two angular degrees of beam deviation and two translational degrees of beam displacement, an autoalignment system can utilize either translational and rotational mirror motions or only rotational motions. The latter choice requires smaller mirror actuator motions and is the easier of the two methods to implement in terms of hardware. Using this latter method, controlling the two rotational and two correction-induced translational displacements of laser beam 10 necessitates rotating or tilting each of two mirrors in two degrees of freedom. Thus, to establish pointing stabilization for output laser beam 10, the autoalignment system according to the present invention incorporates two turning mirrors $M_4$ and $M_5$, each tiltable with respect to two orthogonal axes.

Maintenance of the symmetrical, annular "look" of laser beam 10, as distinct from pointing accuracy, necessitates effectuating mode control for unstable resonator cavity 9. This necessitates compensating for misalignments manifested in the mirrors of the resonator cavity. To this end, the autoalignment system according to the present invention controls the orientation of the mirrors of resonator cavity 9 in addition to controlling the two turning mirrors $M_4$ and $M_5$. Thus, to insure effective mode control, concave mirror $M_1$ and convex/coupling mirror $M_2/M_3$ are each tiltable with respect to two orthogonal axes.

The autoalignment system according to the present invention utilizes a separate, HeNe laser 22, located at the downstream end of the high power laser train, to generate a beam of alignment radiation 20. Alignment beam 20 propagates upstream through beam splitter 24 (the function of which will be described below) in a path parallel, but opposite, to high power laser beam 10. Alignment beam 20 impinges on turning mirror $M_5$, reflecting in a path incident to a mirror splitter 8. Mirror splitter 8 comprises a transparent optical window with two parallel reflective surfaces; the front surface of the mirror splitter has a 50%-reflective coating and the back surface has a 100%-reflective coating. Mirror splitter 8 is fixedly attached to turning mirror $M_4$, its reflecting surfaces being parallel to the reflecting surface of the turning mirror. Consequently, any tilt adjustment to turning mirror $M_4$ will result in an equivalent tilt adjustment to mirror splitter 8, with corresponding alterations in reflected beam direction.

The dual reflective surface of mirror splitter 8 functions to divide incident alignment beam 20 into two parallel, displaced beams: a pointing-alignment beam 19 and a mode-control beam 21. The two beams reflect from the two reflective surfaces of mirror splitter 8, both still parallel to high power laser beam 10, and propagate in the direction of resonator coupling mirror $M_3$. As will be described below, pointing-alignment beam 19 and mode-control beam 21 are then directed on separate optical paths. This enables the two required alignment tasks-pointing stability and mode control to be performed using only the single alignment laser 22.

Pointing stability is maintained by establishing an optical alignment path which includes the mirrors responsible for directing the pointing of output laser beam 10, i.e., turning mirrors $M_4$ and $M_5$. To this end, pointing-alignment beam 19 reflects from the front surface of mirror splitter 8 on a path incident to a partially reflective window 31. The transmitted portion of pointing-alignment beam 19 impinges on a null position detector 30 attached to coupling mirror $M_3$. The portion of incident pointing-alignment beam 19 reflected from partially reflective window 31 propagates back along a path coincident with the path of incident pointing alignment beam 19 and alignment beam 20. After reflecting from mirror splitter 8 (essentially reflecting from turning mirror $M_4$) and turning mirror $M_5$, the partially reflected beam impinges on beam splitter 24 at the output end of the high power laser train. Beam splitter 24 is chosen to be optically transparent to radiation propagating in one direction but totally reflective to radiation propagating in the other direction. Thus, while alignment beam 20 propagates freely from HeNe laser 24 through beam spitter 24, the partially reflected portion of pointing alignment beam 19 is totally reflected in a path incident to a null position detector 32.

Mode control, on the other hand, is effectuated by establishing an optical alignment path along the optical axis of resonator cavity 9, between the two end mirror configurations of the cavity. Thus, after reflecting from the back surface of mirror splitter 8 in the direction of resonator coupling mirror $M_3$, mode-control beam 21 reflects from the coupling mirror in a path along the axis of resonator cavity 9. The beam impinges on a partially reflective window 33. The transmitted portion of mode-control beam 21 impinges on a null position detector 34 attached to concave end mirror $M_1$. The portion of mode-control beam 21 reflected from partially reflective window 33 propagates back along the optical axis of resonator cavity 9 in a path incident to a null position detector 36 attached to coupling mirror $M_3$.

The operation of the autoalignment system according to the present invention involves two basic functions, detecting misalignments in the mirrors of the laser train and translating the error signals corresponding to the detected misalignments into corrective tilt adjustments to the controlled mirrors of the laser train. Misalignments in the mirrors of the laser train, i.e., in resonator mirrors $M_1$ and $M_2/M_3$ and turning mirrors $M_4$ and $M_5$, will produce deflections in the pointing direction of laser beam 10 and/or mode distortions in resonator cavity 9. Correspondingly, since the alignment beams, i.e., alignment beam 20, pointing-alignment beam 19 and mode-control beam 21, propagate in paths defined by the mirrors of the high power laser train, misalignments in main laser mirrors $M_1$, $M_2/M_3$, $M_4$ and $M_5$ will result in directional deflections in the alignment beams. In other words, the above technique permits the inclusion of all possible structural contributors to beam misalignment within the two alignment paths. Thus, misalignment induced displacements in laser beam 10 can be inferred from deviations detected in pointing-alignment beam 19 and mode-control beam 21. For example, assume turning mirror $M_4$ becomes misaligned. Attached mirror splitter 8 will correspondingly exhibit a tilt misalignment. This, in turn, will introduce a directional error in the reflected paths of pointing-alignment beam 19 and mode-control beam 21. Directional errors, such as these, in the paths of alignment beam 20, pointing-alignment beam 19 and mode-control beam 21 appear at null position detectors, 30, 32, 34 and 36 as impinging beam displacements from an established null position.

Null position detectors 30, 32, 34 and 36 can each be any two-orthogonal-axis detector device, such as a distributed or segmented quad detector, which is capable of generating a two coordinate error signal corresponding to the position of an impinging beam with respect to an established null position. The null position detectors provide alignment reference points for the autoalignment system according to the present invention. Their established null positions define the desired steady-state condition with respect to pointing direction and cavity mode. Correlatively, errors in pointing direction and/or distortions in cavity mode will be detected by null position detectors 30, 32, 34, and 36, generating a corresponding two-coordinate error signal for each null position detector.

Once angular or translational directional errors in laser beam 10 have been detected, the second function of the autoalignment system according to the present invention is to translate the corresponding null-detector error signals into corrective tilt adjustments to the controlled mirrors of the high power laser train, i.e., resonator cavity mirrors $M_1$ and $M_2/M_3$ and turning mirrors $M_4$ and $M_5$. This is accomplished by means of a central matrix control device 40. Matrix control device 40 is coupled between null position detectors 30, 32, 34 and 36 and tilting devices 42, 44, 46 and 48. The four sets of two-coordinate error signals are inputted into the matrix control device. It operates to derive from these error signals, a set of four corrective, mirror-actuating tilt commands, each encompassing two degrees of tilt freedom. Each of these tilt commands is transmitted to a respective mirror-actuating tilting device resulting in four separate tilt adjustments in two degrees to the four controlled mirrors of the high power laser train. These mirror actuating tilt commands, being derived from the error signals corresponding to the angular deviations in, and translational displacements of, the alignment beams, are precisely correlated to the particular laser mirror misalignments which gave rise to these beam-alignment errors. Consequently, the resulting tilt adjustments can compensate for mirror misalignments by controlling the attitude of the controlled mirrors of the laser train, thereby effectuating pointing stabilization and cavity mode control.

In the preferred embodiment, matrix control device 40 is an analog processor although available microprocessor technqies together with appropriate interface electronics may be utilized. As described above, the essential task of matrix control devie 40 is to derive a set of four mirror-actuating, two-degree tilt commands (for a total of eight commands) from a set of four two-cordinate error signals (for a total of eight error signals). This derivation is complicated by the optical and structural interactions exhibited by the autoalignment system according to the present invention. The control system embodied in matrix control device 40 is designed to eliminate these coupling effects, thereby allowing the correction of any one of the three characteristic system misalignments angular beam deviations, translational beam displacements and cavity mode deterioration without inducing either of the other two characteristic misalignments. More specifically, matrix control device 40 embodies a system-alignment algorithm, deriving from a given set of error signals indicative of structural misalignments manifested in the high power laser train to provide a set of mirror-actuating tilt commands which, when simultaneously implemented, compensate for the misalignments and realign the high power laser apparatus. Thus, the essential algorithmic function of matrix control device 40 is to analogrithmically compute the simultaneous solutions to a matrix of $8 \times 8$ simultaneous equations. By way of illustration, these $8 \times 8$ simultaneous alignment equations might be written $$D_{11} = a_{11}T_{11} + a_{12}T_{12} + a_{13}T_{21} + \ldots + a_{18}T_{42}$$

$$D_{12} = a_{21}T_{11} + a_{22}T_{12} + a_{23}T_{21} + \ldots + A_{28}T_{42}$$

$$D_{21} = a_{31}T_{11} + a_{32}T_{12} + a_{33}T_{21} + \ldots + A_{38}T_{42}$$

$$D_{42} = a_{81}T_{11} + a_{82}T_{12} + a_{83}T_{21} + \ldots + a_{88}T_{42}$$

where $(D_{11}, D_{12})$, $(D_{21}, D_{22})$, $(D_{31}, D_{32})$ and $(D_{41}, D_{42})$ represent the set of four two-coordinate error signals inputted to matrix control device 40 by the four null position detectors; $(T_{11}, T_{12})$, $(T_{21}, T_{22})$, $(T_{31}, T_{32})$ and $(T_{41}, T_{42})$ represent the set of four, mirror-actuating, two-degree tilt commands which must be derived by the operation of matrix control device 40; and $a_{11}$, $a_{12}$, $a_{13}$ ... $a_{88}$ represent system constants corresponding to the optical and structural design parameters of the high power laser apparatus including the autoalignment system according to the present invention.

The algorithm of matrix control device 40 is embodied in a decoupling analog subprocessor 41. Decoupling subprocessor 41 can be any analog device capable of deriving the simultaneous, mirror-actuation solutions to the above described $8 \times 8$ simultaneous equations. In the preferred embodiment, the subprocessor can be assembled using commerically available op amps. The circuit parameters of the subprocessor (feedback loop gains, quiescent set points, etc.) are chosen to reflect the system constants corresponding to the optical and structural design parameters of the high power laser train. Specifically, the system coefficients $a_{11}$, $a_{12}$, $a_{13}$, and $a_{88}$, are calculated with reference to the design parameters of the high power laser apparatus and are hardwired in to the components of decoupling subprocessor 41. Decoupling subprocessor 41 is then capable of deriving the mirror-actuating tilt commands by solving the above described $8 \times 8$ simultaneous alignment equations, thereby performing the algorithmic function of matrix control device 40.

The autoalignment system according to the present invention can be illustratively discussed with reference to the linear block diagram in FIG. 2. This figure presents a functional representation of the autoalingment system in flow diagram form amenable to the characterization of the system in terms of an alignment transfer function. To facilitate the discussion, only the pointing stabilization aspect of the alignment problem (identified above as pointing stabilization and mode control) is considered, although, the inclusion of mode control would be analogous. This reduces the complexity of the relevant laser train since, it will be recalled, only two mirrors, each tiltable with respect to two degrees of freedom, are required to control pointing alignment. It will also be recalled that the pointing of the high power laser beam can be characterized in terms of two rotational ($\theta$ and $\phi$) and two translational (X and Y) degrees of pointing freedom. Accordingly, the autoalignment system relevant to pointing alignment can be functionally defined by four, differentiated alignment control loops, one associated with each of these parameters. This functional terminology is adopted in FIG. 2 which shows a rotational alignment control loop having as a functional output the ortational parameter $\theta$ and a translational alignment control loop having as a functional output the translational parameter X. For reasons of descriptive economy, the alignment control loops associated with the rotational parameter $\phi$ and the translational parameter Y are not shown. The operation with respect to $\phi$ and Y is similar; hence the ensuing discussion is equally applicable to those degrees of beam rotation and translation.

Figure 2:
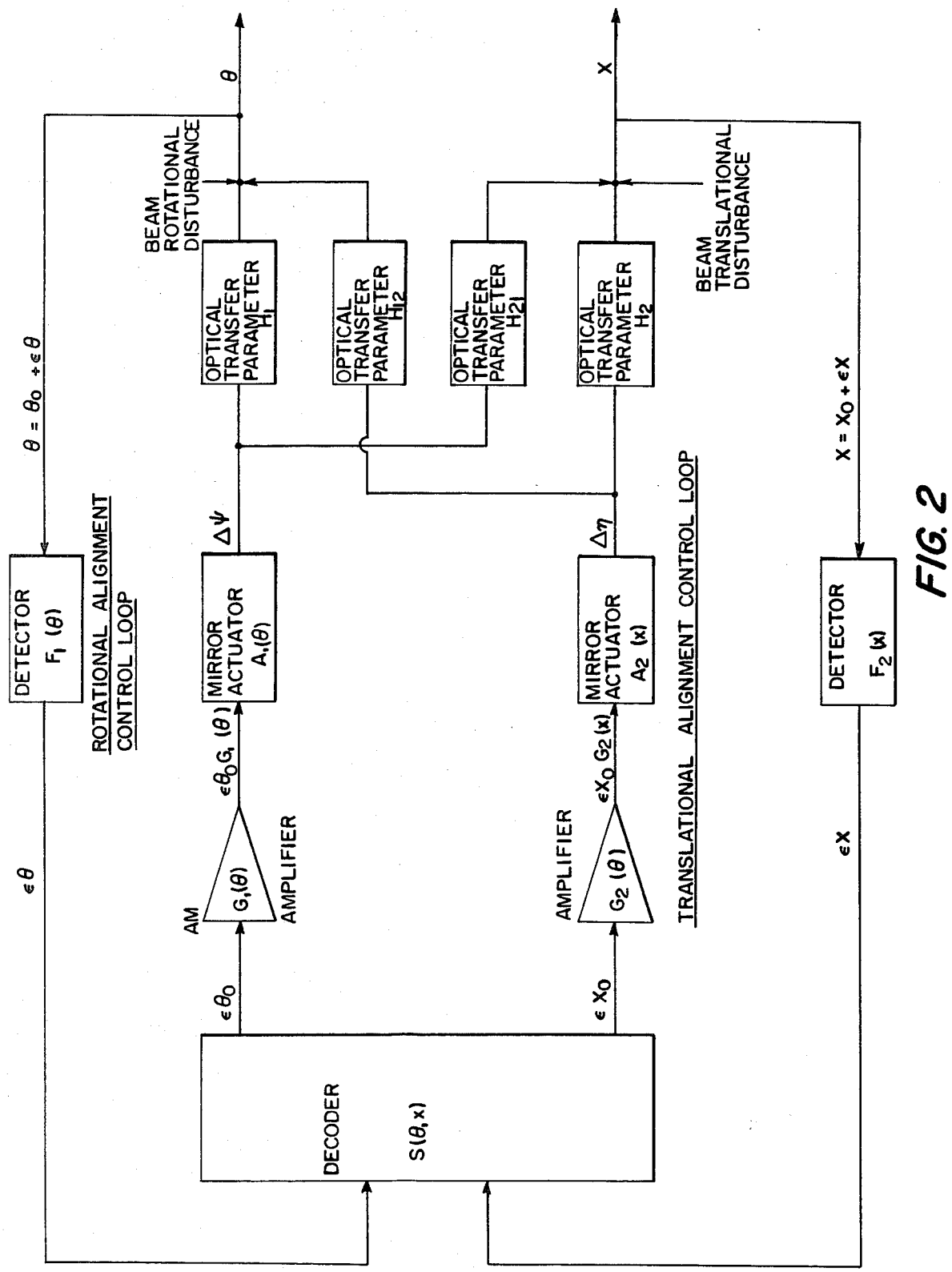
FIG. 2 is a linear block diagram presenting a functional representation of the alignment control loops corresponding to the beam rotational parameter $\theta$ and the beam translational parameter X, in flow diagram form, in accordance with the present invention.

The linear flow diagram in FIG. 2 of the rotational and translational alignment control loops embodies the two essential functions of the autoalignment system according to the present invention detection beam rotational and/or translational disturbances and translating the detected beam disturbances into compensating mirror tilt adjustments. The functional output of each alignment control loop, the parametric value $\theta$ or X, represents the state of system alignment with respect to that parameter. To represent functionally the portion of the autoalignment system associated with tthe rotational parameter $\theta$, the block diagram of the rotational alignment control loop manifests, in operational sequence, a detector function $F_1(\theta)$, a decoupler function $S(\theta, X)$ an amplifier function $G_1(\theta)$ and a mirror actuator function $A_1(\theta)$. Similarly, the block diagram of the translational alignment control loop manifests, in operational sequence, a detector function $F_2(X)$, the decoupler function $S(\theta, X)$, an amplifier function $G_2(X)$ and a mirror actuator function $A_2(X)$. Finally, the linear flow diagrams of the rotational and translational alignment control loops are functionally closed, and coupled, by four optical transfer parameters $H_1$, $H_2$, $H_{12}$ and $H_{21}$. The loop optical transfer parameters $H_1$ and $H_2$ appear, respectively, in the rotational alignment control loop (in operational sequence between the mirror actuator function $A_1(\theta)$ and the parametric output and in the translational alignment control loop (in operational sequence between the mirror actuator function $A_2(X)$ and the parametric output X). The coupling optical transfer parameters $H_{12}$ and $H_{21}$ appear in operational sequence, respectively, between the mirror actuator function $A_2(X)$ and the parametric output $\theta$ and between the mirror actuator function $A_1(\theta)$ and the parametric output X. As will be discussed below, these optical transfer parameters represent the optical and physical dimensions of the laser train.

In relation to the components of the preferred embodiment, the detector functions $F_1\theta$ and $F_2(X)$ represent the null position detectors 30, 32, 34 and 36. The decoupler function $S(\theta, X)$ together with the amplifier functions $G_1(\theta)$ and $G_2(X)$ represent matrix control device 40 with the decoupler function representing the decoupling subprocessor 41. Amplifier functions $G_1(\theta)$ and $G_2(X)$ were included in the linear flow diagram representation of the matrix control device 40 to introduce the amplification factors $G_1(\theta)$ and $G_2(X)$. Finally, the mirror actuator functions $A_1(\theta)$ and $A_2(X)$ correspond to the tilting devices 42 and 44 which control the two mirrors associated with pointing alignment in the preferred embodiment.

The operational sequence of the autoalignment system according to the present invention, in terms the linear flow diagram in FIG. 2, is as follows. As noted above, system alignment is defined in terms of the parametric outputs $\theta$ and X. If the parametric values $\theta_o$ and $X_o$ represent the state of beam pointing alignment, and if beam rotational and translational disturbances are denominated $\epsilon\theta$ and $\epsilon X$, respectively, then the parametric outputs can be written $\theta = \theta_o + \epsilon\theta$ and $X = X_o + \epsilon X$. Considering the functional operation of the rotational and translational alignment control loops, the detector functions $F_1(\theta)$ and $F_2(X)$ operate on the parametric outputs $\theta = \theta_o + \epsilon\theta$ and $X = X_o + \epsilon X$, respectively, yielding the representative beam rotational and translational displacements $\epsilon\theta$ and $\epsilon X$. The decoupler function $S(\theta, X)$ operates on the beam displacement indications $\epsilon\theta$ and $\epsilon X$, yielding a representative rotational alignment error $\epsilon\theta_o$ and a representative translational alignment error $\epsilon X_o$. In accordance with the function of the decoupling subprocessor 41, embodied in the decoupler function $S(\theta, X)$, the decoupled rotational alignment error $\epsilon\theta_o$ represents the rotational component of the beam disturbance indication $\epsilon\theta$ after any translation-induced component is eliminated. Similarly, decoupled translational alignment error $\epsilon X_o$ represents the translational component of the beam disturbances $\epsilon X$ after any rotation-induced component is eliminated.

The operation of the amplifier functions $G_1(\theta)$ and $G_2(\theta)$ introduces an amplification gain factor yielding the representative tilt commands $\epsilon\theta_o G_1(\theta)$ and $\epsilon X_o G_2(X)$, respectively. These tilt commands correspond to those of matrix control device 40 in the preferred embodiment. The representative tilt commands $\epsilon\theta_o G_1(\theta)$ and $\epsilon X_o G_2(X)$ are operated on by, respectively, the rotational alignment loop mirror actuator function $A_1(\theta)$ and the translational alignment loop mirror actuator function $A_2(X)$, yielding representative mirror tilt adjustments denominated $\Delta\Omega$ and $\Delta\eta$, respectively. These representative tilt adjustments correspond to the actual rotational tilt movements in the two mirrors of the laser train associated with pointing alignment, i.e., turning mirrors $M_4$ and $M_5$.

For given rotational adjustment, $\Delta\Omega$ and $\Delta\eta$ to the orientation of the two pointing mirrors of the laser train, the actual affect on beam pointing, i.e., on the rotational and translational parameters of the beam, depends on the optical and physical dimensions of the laser train. And, it will be remembered, corrective mirror rotations to control one parameter of beam pointing induce changes in the other parameters. The linear flow diagram in FIG. 2 incorporates these optical relationships by means of the optical transfer parameters $H_1$, $H_2$, $H_{12}$ and $H_{21}$. With respect to the functional output $\theta$ of the rotational alignment control loop, the optical transfer parameters $H_1$ and $H_{12}$ operate on the representative rotational movements $\Delta\Omega$ and $\Delta\eta$, respectively, yielding the rotational and translation induced components of the output parameter $\theta$. Similarly, the operation of the optical transfer parameters $H_2 H_{21}$ yields the translational and rotation-induced components of the output parameter X of the translational alignment control loop.

Figure 3:
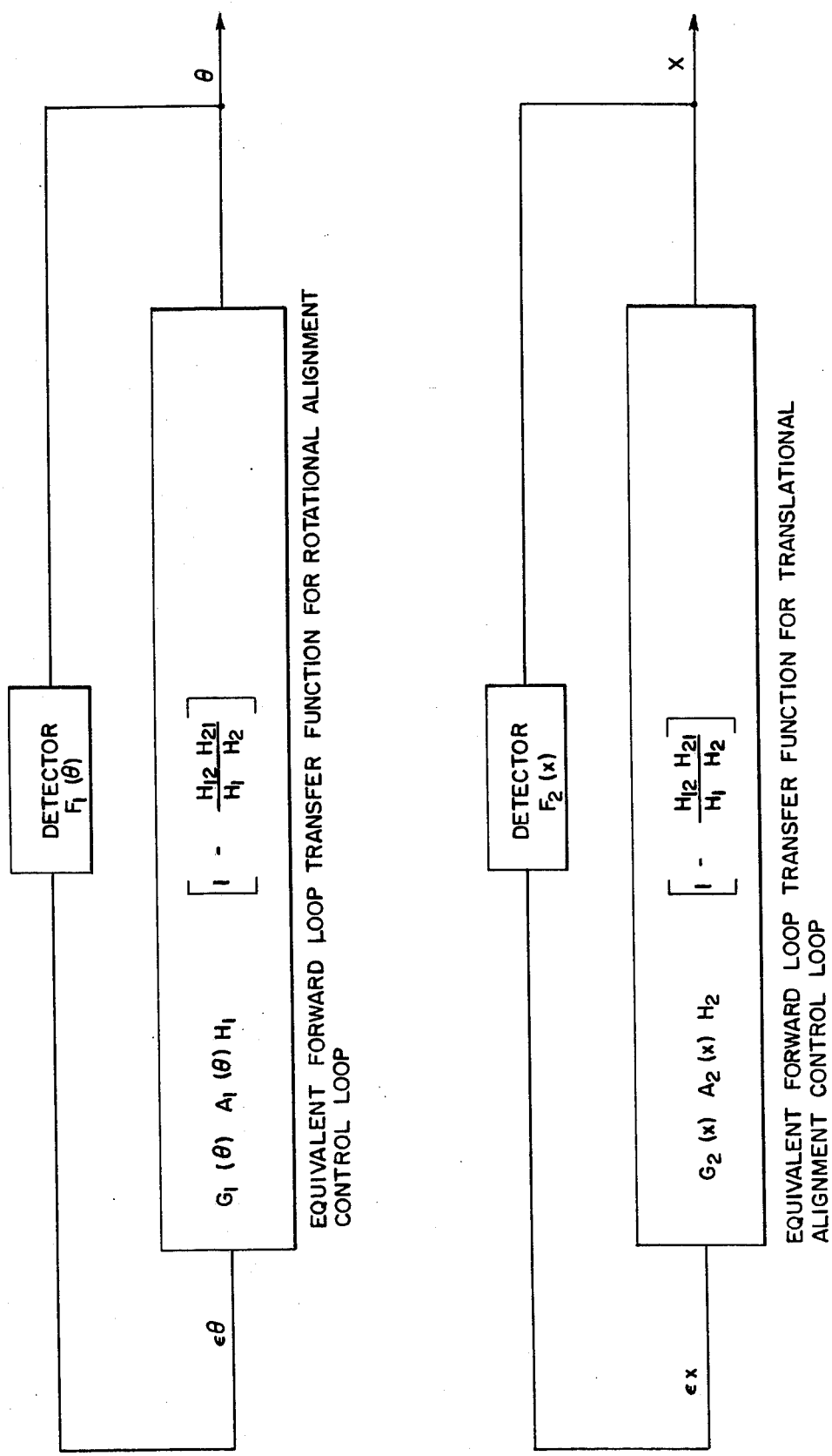
FIG. 3 is a linear flow diagram of the equivalent forward loop transfer functions of the decoupled alignment control loops for the beam rotational parameter $\theta$ and the beam translational parameter X.

The above described linear flow analysis of the autoalignment system according to the present invention yields an equivalent forward loop system transfer function for each alignment control loop. As noted above, interloop coupling, by which the correction of beam rotational displacements induces translational displacements and visa versa, is eliminated by the operation of the decoupler function $S(\theta, X)$. Thus, by properly specifying the decoupler function $S(\theta, X)$ in FIG. 2 (which, from above, represents the decoupling subprocessor 41), the autoalingment system is effectively reduced to the two separate alignment control loops shown in FIG. 3, one for the rotational parameter $\theta$ and one for the translational parameter X. FIG. 3 shows the rotational alignment control loop comprising, in operational sequence, the representative output parameter $\theta$, the detector function $F_1(\theta)$ and the equivalent forward loop system transfer function of the decoupled rotational alignment control loop:

$$G_1(\theta)A_1(\theta)H_1 \frac{1 - H_{12}H_{21}}{H_1H_2}$$

Similarly, the translational alignment control loop comprises the representative output parameter X, the detector function $F_2(X)$ and the equivalent forward loop system transfer function of the decoupled rotational alignment control loop:

$$G_2(X)A_2(X)H_2 \frac{1 - H_{12}H_{21}}{H_1H_2}.$$

From the above description of the preferred embodiment, it is apparent that there is disclosed a system for automatically aligning a high power, unstable resonator type laser. The autoalignment system is capable of effectuating pointing stabilization for the output laser beam and mode control for the unstable resonator cavity. The system utilizes a single, HeNe alignment laser and requires that only secondary mirror surfaces and detector packages be placed on the mirror mounts of the laser train.

Obviously, other embodiments and modifications of the present invention will readily come to those of ordinary skill in the art having the benefit of the teachings presented in the foregoing description and the drawings. It is therefore, to be understood that this invention is not to be limited thereto and that said modifications and embodiments are intended to be included within the scope of the appended claims.

What is claimed and desired to be secured by Letters Patent of the United States is:

1. A method of automatically aligning a high power laser having an unstable resonator cavity defined by a first end mirror configuration and a second end mirror configuration and at least first and second turning mirrors; comprising the steps of:

providing a beam of alignment radiation from an external source;

directing the alignment beam along the optical train of said highpower laser;

dividing said alignment beam into first and second alignment beams;

directing said first alignment beam on an optical alignment path defined by a first detector located on said second end mirror configuration, said turning mirrors and a second detector;

directing said second alignment beam along the optical axis of said resonator cavity on an optical alignment path defined by a third detector located on said first end mirror configuration and a fourth detector located on said second end mirror configuration;

detecting any deviation in said first alignment beam and generating corresponding error signals by means of said first and second detectors;

detecting any deviation in said second alignment beam and generating corresponding error signal by means of said third and fourth detectors;

translating said error signals corresponding to deviations in said first and second alignment beams into a set of compensating tilt commands; and tilting said first and second end mirror configurations and said first and second turning mirrors in response to said tilt commands so as to correct the deviations detected in said first and second alignment beams; thereby automatically aligning said high power laser.

2. The method of automatically aligning a high power laser as recited in claim 1 wherein the step of directing said first alignment beam further comprises:

partially transmitting said first alignment beam through a first partially reflective window to impinge upon said first detector; and partially reflecting said first alignment beam from said first partially reflective window to reflect from said first and second turning mirrors and to impinge upon said second detector.

3. The method of automatically aligning said high power laser as recited in claim 2 wherein the step of directing said second alignment beam further comprises:

reflecting said second alignment beam from said second end mirror configuration in a path incident to a second partially reflective window;

partially transmitting said second alignment beam through said second partially reflective window to impinge upon said third detector; and partially reflecting said second alignment beam from said second reflective window to impinge upon said fourth detector.

4. An autoalignment system for a high power laser having an optical train which includes an unstable resonator cavity, having a concave end mirror and a convex/coupling end mirror, and at least first and second turning mirrors; said autoalignment system comprising:

beam splitting means on said first turning mirror for dividing an impinging beam of radiation into two displaced parallel beams;

an external source of radiation for propagating an alignment beam from the output end of said high power laser train to impinge upon said beam splitting means, whereby said alignment beam is split into first and second alignment beams.

first and second detecting means located respectively on said convex/coupling end mirror and at the output end of said high power laser for generating error signals corresponding to the magnitude and orientation of the displacement of an impinging beam of radiation from an established null position;

first means for directing said first alignment beam on an optical alignment path including said first detecting means, said first and second turning mirrors, and said second detecting means; third and fourth detecting means located respectively on said concave and said convex/coupling end mirrors for generating error signals corresponding to the magnitude and orientation of the displacement of an impinging beam of radiation from an established null position;

second means for directing said second alignment beam on an optical alignment path including said third and fourth detecting means;

first, second, third and fourth means for teilting, respectively, said concave and convex/coupling mirrors and said first and second turning mirrors;

means coupled between said first, second, third and fourth detecting means and said first, second, third and fourth tilting means for translating any error signals resulting from directional deviations in said first and second alignment beams detected by said first, second, third, and fourt detecting means into tilt commands to said first, second, third, and fourth tilting means, whereby correlative, corrective tilt adjustments are made in the orientation of said concave and convex/coupling mirrors, and to said first and second turning mirrors effectuating mode control for said unstable resonator cavity and pointing stabilization for the output beam of said high power laser.

5. An autoalignment system as recited in claim 4 wherein:

said first, second, third and fourth detecting means each comprises an X-Y coordinate detector cell for generating two-coordinate error signals indicative of the displacement of an impinging beam from an established null position:

said concave end mirror, said convex/coupling end mirror, and said first and second turning mirrors are each tiltable with respect to two degrees of tilt freedom; and, said translating means comprises a matrix control device incorporating a subprocessing array functioning to solve for four sets of two-coordinate error signals, an alignment matrix of 8 × 8 simultaneous equations wherein the eight unknowns comprise the eight tilt commands required to tilt said mirrors.

6. An autoalignment system as recited in claim 5 wherein said beam splitting means comprises:

a mirror splitter having a first reflective surface comprising an approximately 50% reflective coating and a second parallel reflective surface comprising an approximately 100% reflective coating, said mirror splitter being fixedly mounted to said first turning mirror with said first and second reflective surfaces parallel to the reflective surface of said first turning mirror, whereby, said first alignment beam is reflected from said first reflective surface and said second alignment beam is reflected from said second reflective surface with both said first and second alignment beams being reflected in the direction of said convex/coupling end mirror.

7. An autoalignment system as recited in claim 6 wherein, said first directing means comprises:

a partially-reflecting, partially-transmitting mirror located between said beam splitter and said first detecting means in the optical path of said first alignment beam.

8. An autoalignment system as recited in claim 7, wherein:

said first directing mean further comprises a mirror, located in the optical path between said radiation source and said second turning mirror and in the optical path between said second turning mirror and said second detecting means, transmitting radiation impinging thereon from one direction and reflecting radiation impinging thereon from the opposite direction.

9. An autoalignment system as recited in claim 8, wherein:

said second directing means comprises a partially-reflecting, partially-transmitting mirror located between said third and fourth detecting means whereby said second alignment beam, after reflecting from said convex/coupling end mirror, is partially transmitted to impinge on said third detecting means and partially reflected to impinge on said fourth detecting means.

10. An autoalingment system as recited in claim 9, wherein:

said external source of radiation comprises a HeNe laser.

11. An autoalingment system as recited in claim 10, wherein:

said first, second, third, and fourth detecting means each comprise a distributed quad cell.

12. An autoalignment system as recited in claim 10, wherein:

said first, second, third, and fourth detecting means each comprise a segmented quad cell.

13. An autoalignment system as recited in claim 11, wherein:

said first, second third, and fourth tilting means each comprise a piezoelectric driver.

14. An autoalignment system as recited in claim 12, wherein:

said first, second, third, and fourth tilting means each comprise a piezoelectric driver.

15. An autoalignment system as recited in claim 11, wherein:

said first, second, third, and fourth tilting means each comprise a hydraulic driver.

16. An autoalignment system as recited in claim 12, wherein said first, second, third, and fourth tilting means each comprise a hydraulic driver.

* * * * *